United States Patent [19]
Orii

[11] Patent Number: 5,042,110
[45] Date of Patent: Aug. 27, 1991

[54] CASTER WITH INSTALLATION BASE

[75] Inventor: Masaru Orii, Tokyo, Japan

[73] Assignee: Kabushikigaisha Orii, Kanagawa, Japan

[21] Appl. No.: 524,337

[22] Filed: May 16, 1990

[30] Foreign Application Priority Data

May 17, 1989 [JP] Japan .................................. 1-123455

[51] Int. Cl.$^5$ .......................................... B60B 33/04
[52] U.S. Cl. .......................................... 16/32; 16/19
[58] Field of Search .............................. 16/32, 19, 33; 248/188.4, 650; 254/98

[56] References Cited

U.S. PATENT DOCUMENTS

| 2,385,154 | 9/1945 | Nalle | 16/19 |
| 3,455,526 | 7/1969 | Orii . | |
| 3,545,707 | 12/1970 | Orii . | |
| 3,602,464 | 8/1971 | Orii . | |
| 4,339,842 | 7/1982 | Fontana | 16/32 |
| 4,364,148 | 12/1982 | McVicker | 16/32 |
| 4,800,617 | 1/1989 | Yeh | 16/32 |

FOREIGN PATENT DOCUMENTS 48-026655 3/1973 Japan .
52-158464 12/1977 Japan .
63-232001 9/1988 Japan .

Primary Examiner—Kurt Rowan
Assistant Examiner—J. Miner
Attorney, Agent, or Firm—Collard, Roe & Galgano

[57] ABSTRACT

A caster with an installation base comprises a shaft to be secured to a leg or bottom of a machine or instrument, a frame rotatably mounted on the shaft, movement wheels supported on the frame, an installation base arranged unrotatably and vertically movable on the frame, and a handle member for vertically moving the installation base. The frame comprises a connecting portion rotatably mounted on the shaft and an axle supporting portion for supporting an axle of the movement wheels. The installation base comprises a first portion arranged in the periphery of the connecting portion of the frame and formed in the outer peripheral surface with an external thread and a second portion positioned below the shaft to come into contact with an installation surface. The handle member is arranged in the periphery of the first portion of the installation base so that an internal thread formed in the inner peripheral surface thereof is threadedly engaged with the external thread of the installation base and rotatably supported on the shaft.

4 Claims, 9 Drawing Sheets

CASTER WITH INSTALLATION BASE

BACKGROUND OF THE INVENTION

1. Field of the Invention

The present invention relates to an improvement in a caster with an installation base mounted on the leg or bottom of various machines and instruments such as press machines to facilitate movement, installation, vibration-damping and stabilization of the machine or instrument and which can adjust a level of the machine or instrument.

2. Description of the Prior Art

A caster with an installation base has been heretofore known from, for example, U.S. Pat. No. 3,602,464 and the like filed by the present inventor. This caster comprises a wheel for moving a machine or instrument, and an installation base (including a vibration damper) for installing into the moved machine or instrument in a stabilized manner and for buffering against vibration of the machine or instrument itself or vibration from outside.

FIG. 14 corresponds to FIG. 3 of U.S. Pat. No. 3,602,464 and is a sectional view showing an example of the aforementioned prior art caster. Reference numeral 1 denotes a mounting nut secured to the leg or bottom of a machine or instrument, the nut being provided in the center thereof with a threaded hole 2 with which a mounting bolt (not shown) is threadedly engaged. An angularly formed handle 3 is adapted to vertically move a vibration-damper 4 made of synthetic rubber, synthetic resin or the like. A frame 5 is rotatably mounted on the mounting nut 1 through a thrust cover which will be described later, and a single wheel or movement wheel 6 is supported on the frame 5.

The mounting nut is internally formed with an annular groove 7, which receives an upper end of a thrust cover 10 rotatably held by steel ball bearings 8 and 9. The thrust cover 10 and the steel ball bearings 8 and 9 are supported by a thrust washer 11 secured to the mounting nut 1. The lower end of the thrust cover 10 is arranged in the form of a collar and welded to the upper end of the frame 5. The handle 3 arranged externally of the thrust cover 10 is supported with the bottom thereof placed on the collar-like lower end of the thrust cover 10. A gear portion 12 is provided on the inner peripheral surface of the handle 3. The frame 5 is formed with a cylindrical portion 13 into which is fitted the vibration damper 4 and a parallel portion 15 onto which the wheel 6 is mounted by a shaft 14.

A gear stopper 16 is fitted on the frame 5. In this gear stopper 16, a hole is provided at a position on one side from a center 17 of the frame 5, and an adjustment bolt 18 extends through the hole. A pinion gear 19 is fixed integrally and rotatably to the upper portion of the adjustment bolt 18, a part of which is meshed with a gear portion 12 of the handle 3 passing through a window portion of the thrust cover 10. A gear thrust 20 is provided upwardly of the pinion gear 19. The vibration damper 4 is formed to be fitted in the inner wall of the cylindrical portion 13 and mounted on an adjustment nut 21 threadedly engaged with the adjustment bolt 18.

At least three of the above-described casters with installation base are mounted on the legs or bottom of the machine or instrument. In the prior art structure shown in FIG. 14, the wheel 6 is in contact with a ground or an installation surface (not shown) of the floor or the like. By pushing the machine or instrument in the desired direction, the wheel 6 can be rolled and moved in the desired direction. To change the desired direction of movement, the direction for pushing the machine or instrument is changed. The resistance of the wheel 6 acts on the frame 5 and the thrust cover 10, whereby the thrust cover 10 is rotated between the ball bearings 8 and 9. Therefore, the direction of the frame 5 and the wheel 6 is changed to the direction of movement.

Where the machine or instrument is installed in the desired position, the frame 5 is held so that the frame may not be rotated, and the handle 3 may be rotated in a fixed direction. When the adjustment bolt 18 is rotated through the pinion gear 19 by the rotation of the handle 3, the vibration damper 4 and the adjustment nut 21 are locked by the frame 5. Therefore, the nut 21 descends along the adjustment bolt 18. If the vibration damper 4 is further allowed to move down even after the lower end of the vibration damper 4 has contacted the installation surface, the wheel 6 moves away from the floor or ground surface and ascends.

As described above, in the prior art example shown in FIG. 14, the movement wheel 6 is levitated to above the installation surface by rotating the handle 3, and at the same time, the vibration damper 4 is interposed between the machine or instrument and the ground or floor surface.

However, in the above-described prior art, constituent parts such as the pinion gear 19, adjustment bolt 18 and adjustment nut 21 for converting the rotational movement of the handle 3 into the vertical movement of the vibration damper 4 are absolutely necessary. This prior art necessity creates a problem in that the number of parts increases.

The prior art has another problem based upon the fact that the diameter of the adjustment bolt 18 is small. Hence, the strength of the threaded portion thereof with the adjustment nut 21 and the effective threaded area cannot be increased. This combination of factors may cause a breakage or a looseness due to vibrations.

A proposed prior art solution to this problem is to provide a caster in which the pinion gear 19 and adjustment bolt 18 are not used. In this case, however, another problem occurs in which the rotating operation of the handle becomes heavy and difficult.

SUMMARY OF THE INVENTION

It is a first object of the present invention to provide a caster with an installation base which can reduce the number of parts, can increase a strength of a threaded portion or an effective threaded area of a member for vertically moving an installation base, and can lighten a rotating operation of a handle member.

It is a second object of the present invention to provide a caster with an installation base which can simplify the construction of a frame.

It is a third object of the present invention to provide a caster with an installation base which can eliminate a tilt or looseness of the handle member.

The above first object is accomplished in accordance with the present invention by providing a caster with an installation base, comprising a shaft to be secured to a leg or bottom of a machine or instrument, a frame rotatably mounted on the shaft, movement wheels supported on the frame, an installation base arranged unrotatably and vertically movably on the frame, and a handle member for vertically moving the installation base. This frame comprises a connecting portion rotatably mounted on the shaft and an axle supporting portion for supporting an axle of the movement wheels. This installation base comprises a first portion arranged in the periphery of the connecting portion of the frame and formed in the outer peripheral surface with an external thread and a second portion positioned below the shaft to come into contact with an installation surface. This handle member is arranged in the periphery of the first portion of the installation base so that an internal thread formed in the inner peripheral surface thereof is threadedly engaged with the external thread of the installation base and is rotatably supported on the shaft. The movement wheels are mounted on opposite ends, respectively, of the axle and at a position externally of the internal thread of the handle member.

As a result, the internal thread in the inner peripheral surface of the handle member is arranged in the periphery of the first portion of the installation base. The internal thread is directly threadedly engaged with the external thread in the outer peripheral portion of the first portion of the installation base. Thus, a conventional adjusting bolt is not required and the diameter of the internal thread of the handle member is larger than that of the conventional prior art adjusting bolt. Hence, the number of parts is reduced, and in addition, the strength and effective threaded area of the threaded portion of the member is increased for vertically moving the installation base, thus preventing breakage or looseness caused by vibrations. Two movement wheels are located externally of the internal thread of the handle member whereby the ratio of the diameter of the internal thread to the diameter of the grip portion of the handle member is small. Therefore, despite the fact that the diameter of the internal thread of the handle member is large, the rotating operation of the handle member can be relatively lightened.

The above second object is accomplished in accordance with the present invention by providing a caster with an installation base in which a handle member is mounted on a shaft by a shaft mounting member at the upper portion. Thereby, a portion for receiving the handle member is removed from the frame, and therefore, the construction of the frame can be simplified.

The above third object is accomplished in accordance with the present invention by providing a caster with an installation base in which the connecting portion of the frame is formed with a projection projected into a longitudinal groove of the installation base to come into contact with the internal thread of the handle member. Thereby, a part of the handle member is inserted into the longitudinal groove of the installation base to prevent the handle member from being tilted or loosened by the provision of the projection. Therefore, the tilt or looseness of the handle member can be eliminated.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

DETAILED DESCRIPTION OF THE EMBODIMENTS

Figure 1:
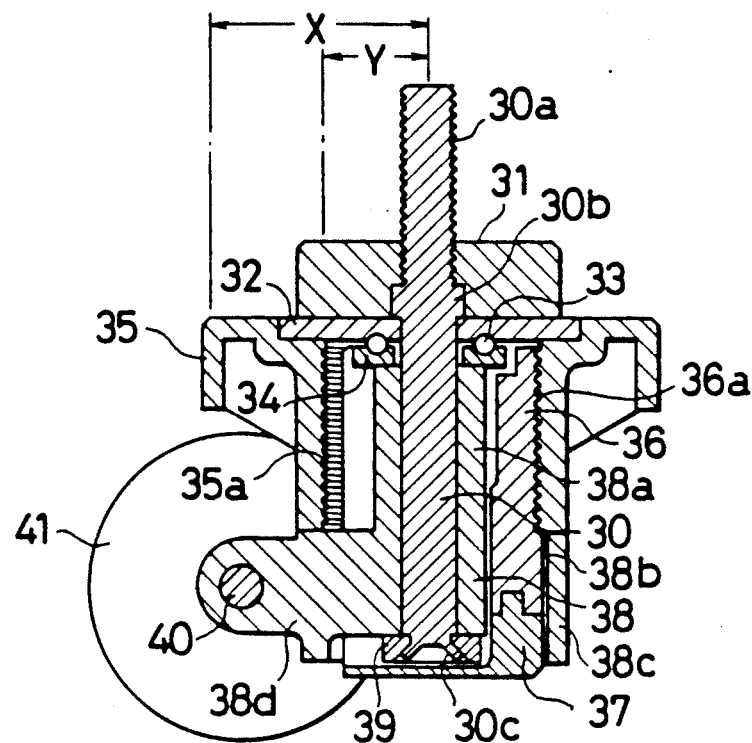
FIG. 1 is a sectional view taken on line A—A of FIG. 2 showing a first embodiment of the caster of the present invention.
Figure 2:
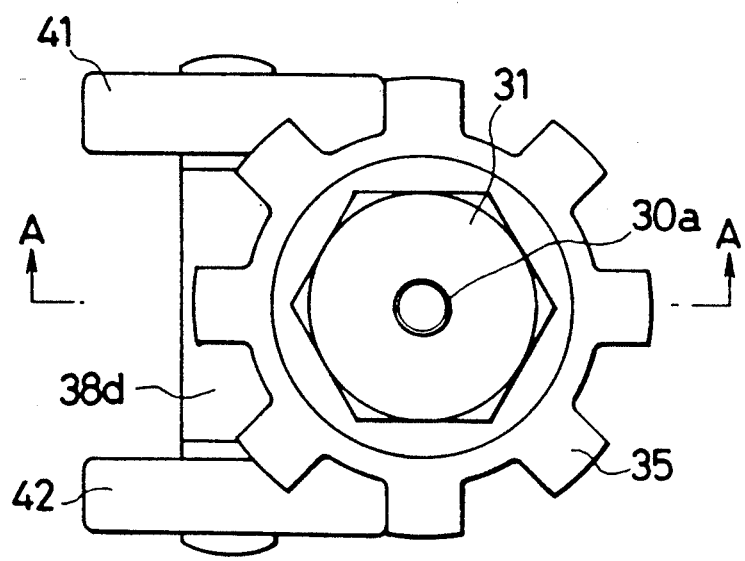
FIG. 2 is a plan view of the caster.
Figure 3:
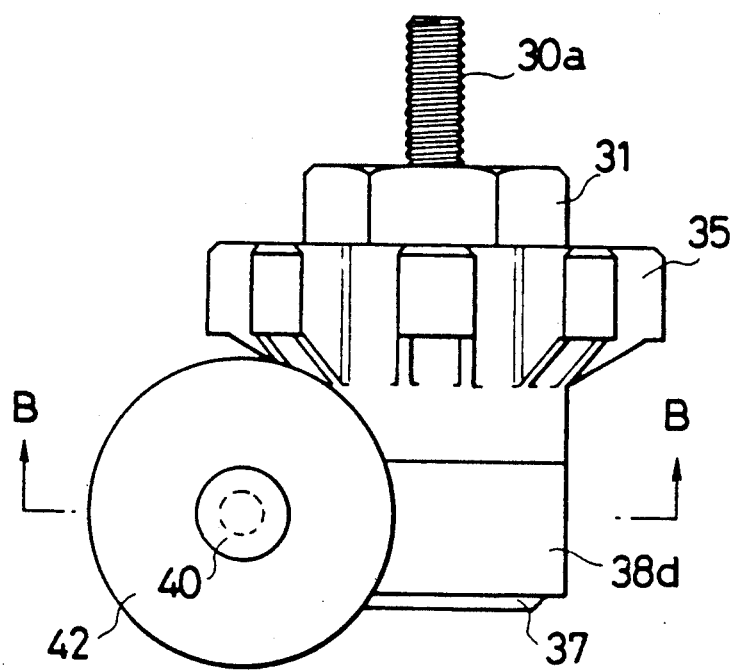
FIG. 3 is a front view of the caster.
Figure 4:
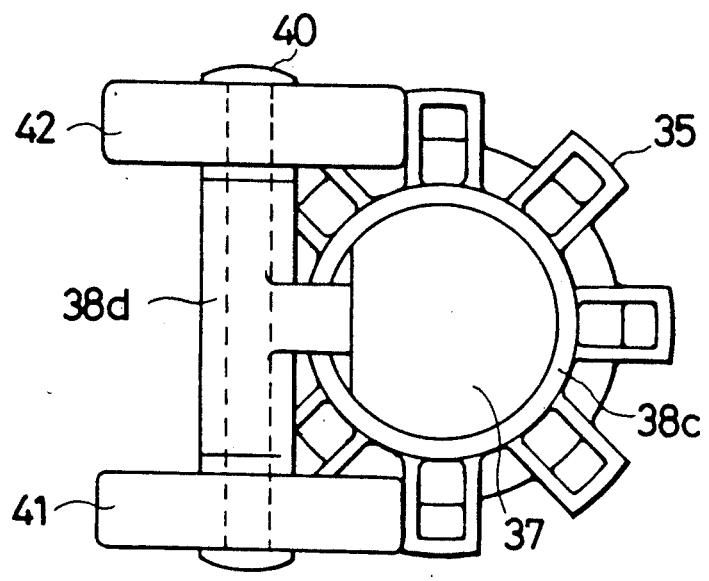
FIG. 4 is a bottom view of the caster.
Figure 5:
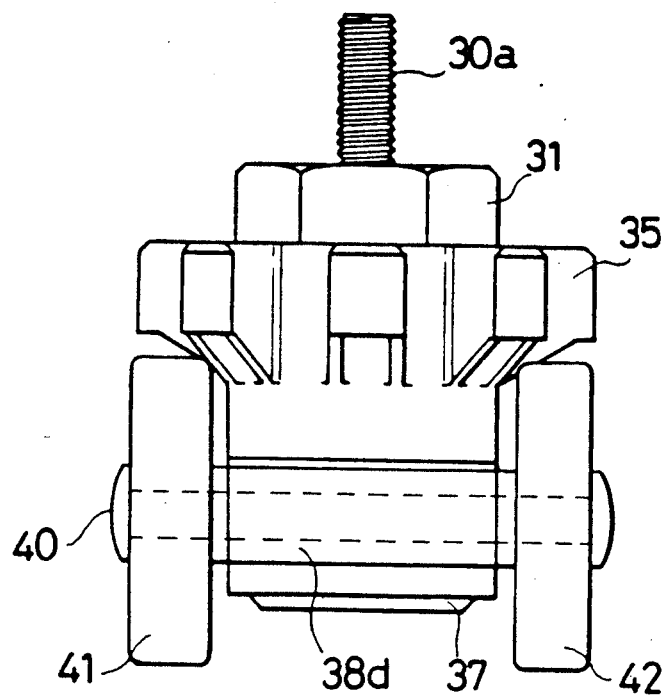
FIG. 5 is a side view of the caster.

Turning now in detail to the drawings, FIGS. 1 to 6 show a first embodiment of the caster of the present invention. This embodiment is directed to the case where the maximum load per one caster is less than 100 kg.

Shaft 30 corresponds to a fixed member of the present invention, the shaft comprising an external thread 30a, a collar 30b and a caulked portion 30c. A mounting nut 31 is threaded into the external thread 30a of the shaft 30 from the top and fitted into the collar 30b, and functions as a seat when the former is mounted on the machine or instrument.

Inserted around the shaft 30 from the bottom are a thrust washer 32, a ball bearing 33, a thrust washer 34, a handle member 35, and installation base holding member 36, an installation base body 37 made of rubber or plastic and a frame 38. A stop washer 39 is mounted on the shaft 30 by caulking the caulked portion 30c. The installation base holding member 36 and the installation base body 37 constitute an installation base. The thrust washer 32 comes into contact with the lower end of the mounting nut 31 and constitutes a thrust bearing along with the ball bearing 33 and the thrust washer 34. The thrust washer 32 receives a thrust force from the handle member 35 and the thrust washer 34 receives a thrust force from the frame 38. The frame 38 forms a cylindrical connecting portion 38a slidably and rotatably mounted in the periphery of the shaft 30. There is a space 38b for receiving the installation base holding member 36 opened at the upper and lower portions thereof to the periphery of the connecting portion 38a. The frame 38 comprises a handle member receiving portion 38c for receiving the handle member 35 and an axle supporting member 38d. A mounting position of the connecting portion 38a on the shaft 30 is determined between the thrust washer 34 and the stop washer 39 whereby the frame 38 is rotatably mounted on the shaft 30.

Figure 6:
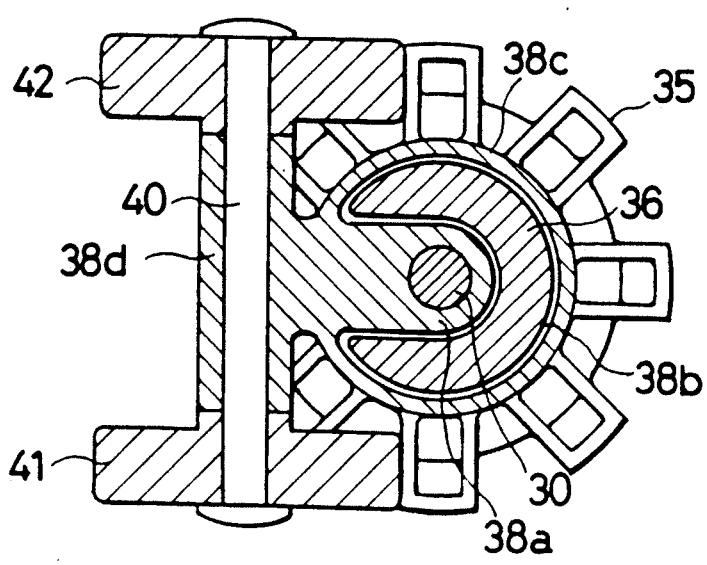
FIG. 6 is a sectional view taken on line B—B of FIG. 3.

The space 38b for receiving the installation base holding member 36 is of a horse shoe type planar shape as shown in FIG. 6. The installation base holding member 36 whose horizontal section is of a horse shoe type is vertically movably received in the space 38b. The installation base holding member 36 is obstructed by the axle supporting portion 38d and cannot be rotated with respect to the frame 38. The installation base holding member 36 is formed in an upper outer peripheral surface thereof with an external thread 36a, which projects upwardly of the handle member receiving portion 38c of the frame 38. The installation base body 37 is fixedly mounted integrally on the lower portion of the installation base holding member 36, the installation base body 37 being projected downwardly of the handle member receiving portion 38c. The handle member 35 is arranged in the periphery of the installation base holding member 36 and rotatably disposed between the handle member receiving portion 38c and the thrust washer 32, and the internal thread 35a formed in the inner peripheral surface of the handle member 35 is threadedly engaged with the external thread 36a of the installation base holding member 36. In this way, the handle member 35 is arranged rotatably with respect to the shaft 30 and the frame 38.

An axle 40 is supported on the axle supporting portion 38d of the frame 38, and two movement wheels, 41 and 42, are mounted, at a position externally of the handle member receiving portion 38c, on opposite ends of the axle 40.

More than three of the above-described casters with an installation base are mounted on the leg or bottom of a machine or instrument such as press machines. In this mounting method, the external thread 30a of the shaft 30 is inserted into a mounting hole (not shown) in the leg or bottom of the machine or instrument, and a nut is screwed onto the external thread 30a. In the embodiment shown in FIGS. 1 to 6, the movement wheels 41 and 42 are in contact with an installation surface (not shown) such as a floor or the ground. The movement wheels 41 and 42 are rolled by pushing the machine or instrument in the desired direction or movement whereby the machine may be moved in the desired direction. To change the direction of movement, one just changes the direction that the machine or instrument is pushed. The resistance of the wheels 41 and 42 with respect to movement on the installation surface exerts a force on the frame 38 and on the thrust washer 34 and acts as a turning force about the shaft 30. Therefore, the direction of the frame 38 and the wheels 41 and 42 freely follow the moving direction because of the rotation of the ball bearings 33. At this time, the weight of the machine or instrument is loaded on the installation surface via the shaft 30 or the mounting nut, thrust washer 32, ball bearing 33, thrust washer 34, connecting portion 38a of the frame 38, axle supporting portion 38d, axle 40 and wheels 41 and 42. Since the handle member 35 is in an unloaded state, there is a clearance formed between the handle member 35 and the thrust washer 32 to provide an embodiment wherein the handle member 35 is merely placed on the handle member receiving portion 38b of the frame 38. Accordingly, when the frame 38 is rotated with respect to the shaft 30, the handle member 35 rotates integral therewith, and the threaded position between the internal thread 35a of the handle member 35 and the external thread 36a of the installation base holding member 36 remains unchanged.

In the case where the caster is installed in position on the machine or instrument, the frame 38 is held so as not to be rotated. However, it is not held if the frictional resistance between the installation surface and the wheels 41 and 42 is greater than the weight of the machine or instrument, and the handle member 35 is rotated in a predetermined direction. Since the installation base holding member 36 is prevented from rotation by the axle supporting portion 38d of the frame 38, the threaded position between the external thread 36a of the installation base holding member 36 and the internal thread 35a of the handle member 35 is changed by the rotation of the handle member 35. Hence, the rotating operation of the handle member 35 is converted into the descending operation of the installation base holding member 36, and the installation base body 35 descends.

If the installation base body 37 is caused to descend even after the lower end surface of the installation base body 37 has contacted the installation surface, the wheels 41 and 42 move away from the installation surface and move upward. At this time, the weight of the machine or instrument is loaded onto the installation surface via the shaft 30 or mounting nut 31, thrust washer 32, handle member 35, threaded portion between the internal thread 35a and external thread 36a, installation base holding member 36 and installation base body 37. If the handle member 35 is rotated under the conditions wherein the installation base body 37 is in contact with the installation surface, a leveling adjustment is affected.

In this first embodiment, the internal thread 35a of the handle member 35 is directly threadedly engaged with the external thread 36a of the installation base holding member 36, and therefore, a conventional adjusting bolt can be eliminated. Therefore, the number of parts can be reduced. The internal thread 35a in the inner peripheral surface of the handle member 35 is brought into direct threaded engagement with the external thread 36a in the outer peripheral surface of the upper portion of the installation base holding member 36. Therefore, the diameter of the internal thread 35a can be made larger than that of the conventional adjusting bolt. Also, the strength and effective threaded-engagement area of the threaded-engagement portion for vertically moving the installation base body 37 can be increased, and the breakage or looseness caused by vibrations can be prevented.

Under conditions where the installation base body 37 is in contact with the installation surface, the weight of the machine or instrument is transmitted via the threaded-engagement portion between the internal thread 35a and the external thread 36a. Thus, it is unavoidable that the rotating operation of the handle member 35 becomes heavy. The lightness or mechanical advantage ratio of the rotating operation is proportional to length X from the center of the shaft 30 to the grip portion of the handle member 35 relative to the length Y from the center of the shaft 30 to the internal thread 35a. In the first embodiment, the two wheels 41 and 42 are located externally of the handle member receiving portion 38c. Therefore, the diameter of the internal thread 35a of the handle member 35, that is, the aforesaid length Y can be decreased. This can lighten the rotating operation of the handle member 35.

Figure 7:
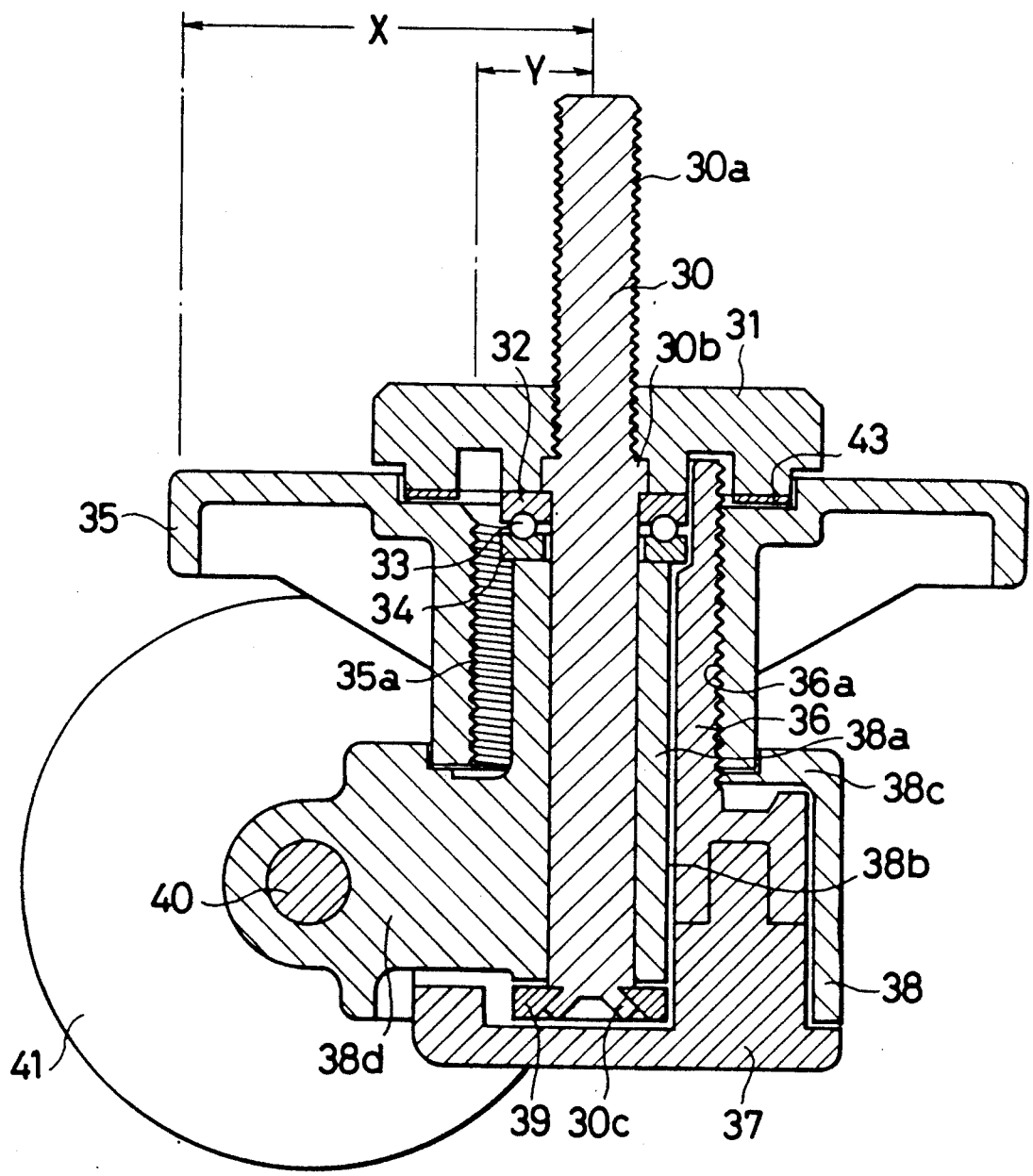
FIG. 7 is a sectional view showing a second embodiment of the caster of the present invention.

FIG. 7 shows a second embodiment of the caster of the present invention. This second embodiment is designed for use where the maximum load per caster is greater than or equal to 100 kg.

The second embodiment is most different from the first embodiment shown in FIGS. 1 to 6 in that the mechanical advantage ratio of length X from the center of the shaft 30 to the grip portion of the handle member 35 to the length Y from the center of the shaft 30 to the internal thread 35a is increased. This will further lighten the rotating operation of the handle member 35.

The handle member 35 is in contact with the annular thrust washer 43 mounted on the lower end of the mounting nut 31.

It is to be noted that the shaft 30 and the mounting nut 31 may be integrally molded. It is further to be noted that the installation base holding member 36 and the installation base body 37 may be integrally molded.

Figure 8:
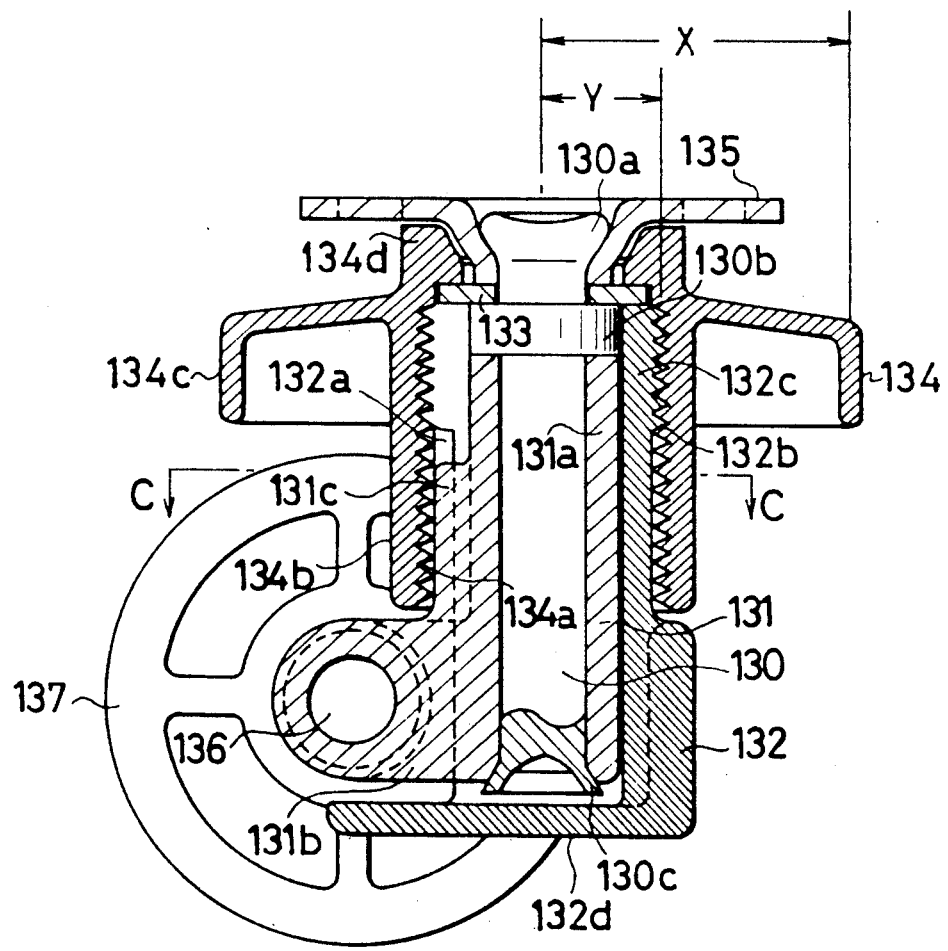
FIG. 8 is a longitudinal sectional view showing a third embodiment of the caster of the present invention.
Figure 9:
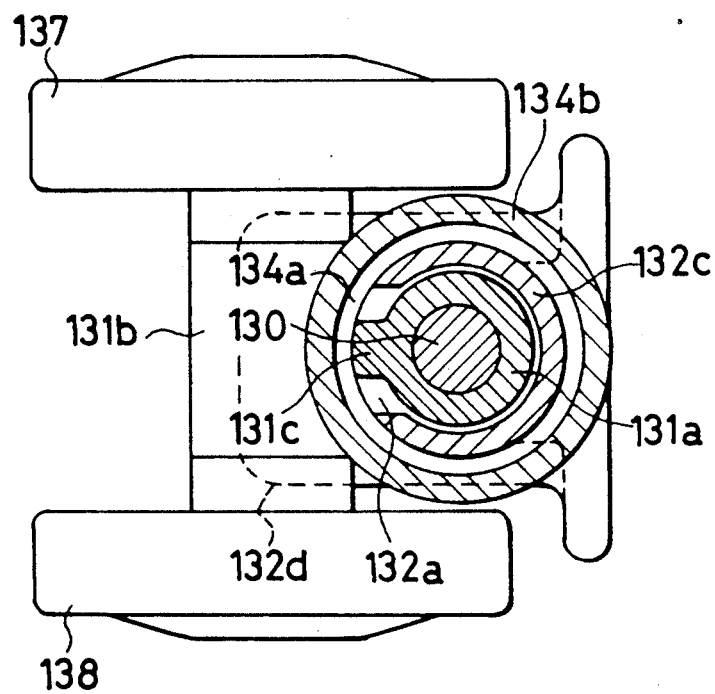
FIG. 9 is a sectional view taken on line C—C of FIG. 8.
Figure 10:
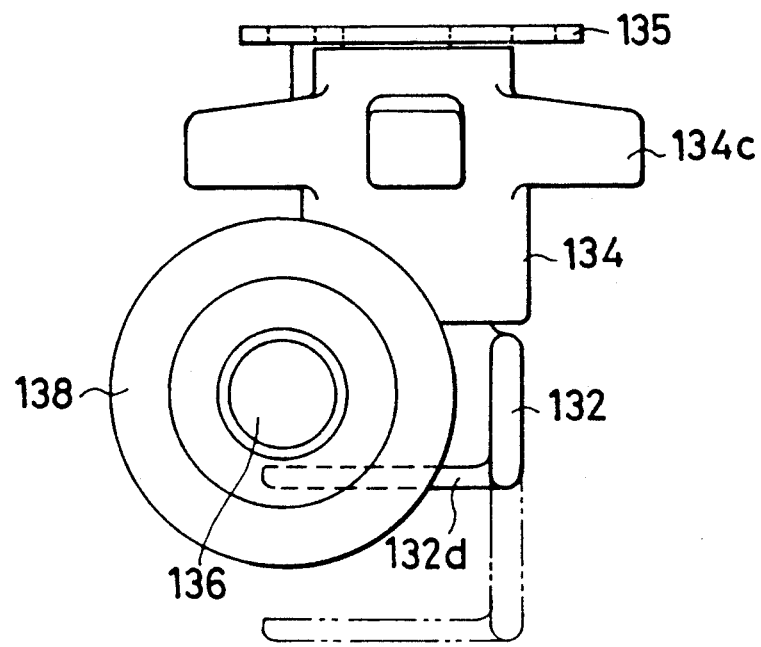
FIG. 10 is a front view showing a third embodiment of the caster of the present invention.
Figure 11:
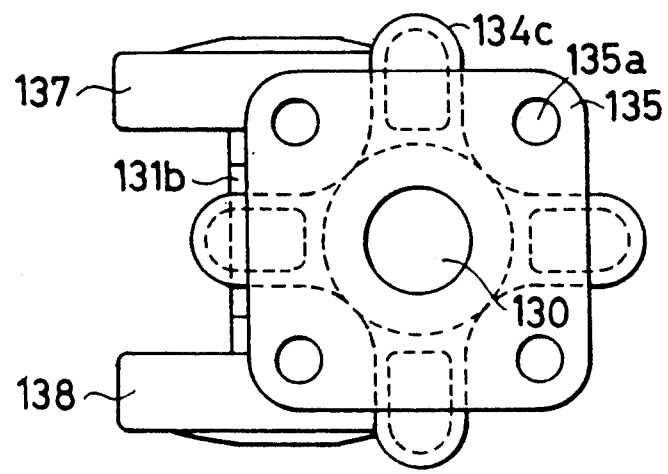
FIG. 11 is a plan view of the caster.

FIGS. 10 and 11 show an external configuration of a third embodiment of a caster of the present invention, and FIGS. 8 and 9 show a section.

Figure 12A:
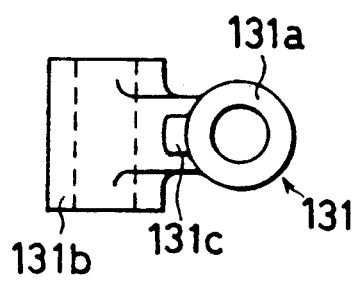
FIGS. 12A and 12B are a plan view and a front view, respectively, showing a frame according to the third embodiment of the present invention.
Figure 12B:
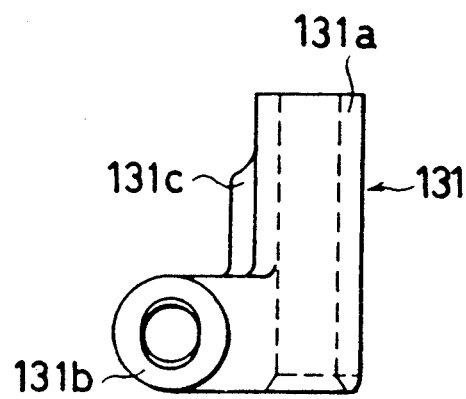

Shaft 130 comprises an upper caulked portion 130a, a large diameter portion 130b and a lower caulked portion 130c. A frame 131 is inserted around the shaft 130 from the bottom. The frame 131 is formed, as shown in FIGS. 12a and 12b, as a cylindrical connecting portion 131a and an axle supporting portion 131b laterally extending from the lower portion of the connecting portion 131a. The connecting portion 131a is provided with a projection 131c which is located upwardly of the axle supporting portion 131b. The frame 131 is inserted until the connecting portion 131a comes into contact with the large diameter portion 130b of the shaft 130, and is mounted on the shaft 130 by caulking with the lower caulked portion 130c.

Figure 13A:
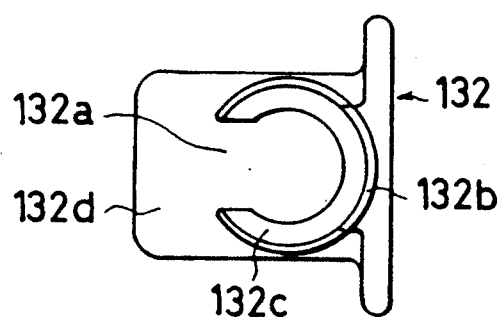
FIGS. 13A and 13B are a plan view and a front view, respectively, showing an installation base according to the third embodiment of the present invention.
Figure 13B:
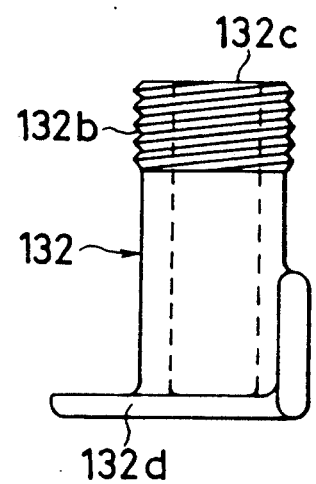
Figure 14:
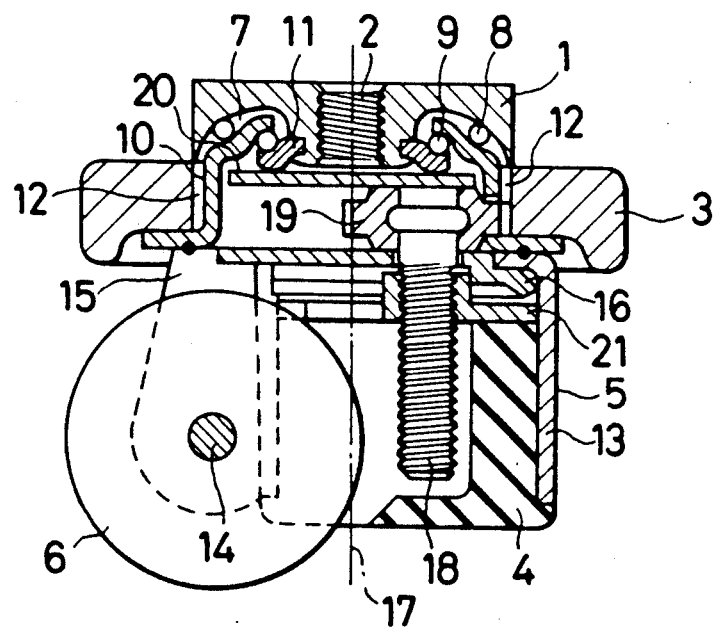
FIG. 14 is a sectional view showing a conventional prior art caster.

Next, an installation base 132 is inserted around the connecting portion 131a of the frame 131 from the bottom. The installation base 132 is formed, as shown in FIGS. 13a and 13b, with a vertical movement adjusting portion 132c having a longitudinal groove 132a, and an installation surface contact portion 132d. Thread 132b is formed in an upper portion of a peripheral surface of the vertical adjusting portion 132c having a horizontal section which is horse shoe shaped. The installation base 132 is formed, for example, of synthetic resin. When the installation base 132 is inserted around the connecting portion 131a of the frame 131, the vertical movement adjusting portion 132c is arranged in the periphery of the connecting portion 131a. The longitudinal groove 132a is fitted with the axle supporting portion 131b and receives the projection 131c, and the installation surface contact portion 132d is located downwardly beneath the shaft 130.

From the top of the shaft 130, a thrust washer 133 is inserted on the large diameter portion 130b of the shaft 130, and the handle member 134 is then inserted, and finally a mounting base 135 is inserted. The handle member 134 comprises a cylindrical portion 134b having an internal thread 134a in an inner peripheral surface thereof, a grip portion 134c provided in 90-degree spaced relation and a rotational connecting portion 134d formed above the internal thread 134a. The internal thread 134a is threadedly engaged with the external thread 132b of the installation base 132. The rotational connecting portion 134d is rotatably held between the thrust washer 133 and the mounting base 135. The upper caulked portion 130a of the shaft 130 is caulked whereby the mounting base 135, the handle member 134 and the installation base 132 are rotatably mounted on the shaft 130. The thrust washer 133, mounting base 135 and upper caulked portion 130a correspond to a shaft mounting member. The mounting base 135 has a mounting hole 135a as shown in FIG. 11. The mounting base 135 is secured to the leg or bottom of the machine or instrument whereby the shaft 130 is mounted on the machine or instrument.

An axle 136 is supported on the axle supporting portion 131b of the frame 131, and two wheels or movement wheels, 137 and 138, are mounted at a position externally of the cylindrical portion 134b of the handle member 134 as best shown in FIG. 9, on opposite ends of the axle 136. In the assembled state, the projection 131c of the frame 131 is in contact with the internal thread 134a of the handle member 134.

At least three of the above-described casters with an installation base are mounted on the leg or bottom of the machine or instrument such as a press machine. In the embodiment shown in FIGS. 8 to 11, the movement wheels 137 and 138 are in contact with the installation surface (not shown) such as a floor. By pushing the machine or instrument in the desired direction, the movement wheels 137 and 138 are rolled, enabling the machine to be moved in the desired direction. To change the direction, the direction in which the machine or instrument is pushed. The resistance of the movement wheels 137 and 138 to the installation surface exerts a turning force on the frame 131, and functions as a turning force about the shaft 130. Therefore, the direction of movement of the frame 131 and the wheels 137 and 138 freely follows in the desired moving direction due to surface sliding at the thrust washer 133. At this time, the weight of the machine or instrument is loaded on the installation surface via the mounting base 135, thrust washer 133, shaft 130, connecting portion 131a of the frame 131, axle supporting portion 131b, axle 136 and wheels 137 and 138. Since the handle member 134 is in no-load state, it is merely placed on the thrust washer 133. Accordingly, when the frame 131 rotates, the handle member 134 rotates integral therewith, and the threaded-engagement between the internal thread 134a of the handle member 134 and the external thread 132b of the installation base 132 remains unchanged.

In installing the machine or instrument at the desired position, the frame 131 is held so as not to be rotated. The frame may not be held where the frictional resistance between the installation surface and the movement wheels 137 and 138 is greater than the weight of the machine or instrument, and the handle member 134 is rotated in a predetermined direction. The installation base 132 is prevented from being rotated by the fitting between the axle supporting portion 131b of the frame 131 and the longitudinal groove 132a. The threaded-engagement position between the external thread 132b of the installation base 132 and the internal thread 134a of the handle member 134 is changed by the rotation of the handle member 134. The rotating operation of the handle member 134 is thereby converted into the descending operation of the installation base 132, and the installation base 132 descends.

If the installation base 132 is allowed to be descended as indicated by dash-dotted contour lines in FIG. 10 even after the installation surface contact portion 132d of the installation base 132 has contacted the installation surface, the movement wheels 137 and 138 move away from the installation surface and ascend. At this time, the weight of the machine or instrument is loaded on the installation surface via the mounting base 135, handle member 134, the threaded-engagement portion between the internal thread 134a and the external thread 132b and installation base 132. Under these conditions, where the installation base 132 is in contact with the installation surface and the handle member 134 is rotated, a level adjustment is effected.

Under these conditions where the installation base 132 is in contact with the installation surface, the weight of the machine or instrument is transmitted via the threaded-engagement portion between the internal thread 134a and the external thread 132b. Therefore, it is unavoidable that the rotating operation of the handle member 134 becomes heavy. The lightness of the rotating operation is proportional to the ratio of the length X from the center of the shaft 130 to the grip portion 134c of the handle member 134 to the length Y from the center of the shaft 130 to the internal thread 134a. In this third embodiment, the two movement wheels 137 and 138 are located externally of the internal thread 134a of the handle member 134, just as with the first and second embodiments. Thus, the diameter of the internal thread 134a of the handle member 134, that is, the length Y can be decreased. Therefore, the rotating operation of the handle member 134 can be lightened.

In this third embodiment, the handle member 134 is mounted on the shaft 130 at the upper part thereof to thereby remove a handle member receiving portion from the frame 131. Hence, the construction of the frame 131 can be simplified.

The handle member 134 is mounted on the shaft 130 at the upper part thereof with the result that assuming that the projection 131c is not present on the frame 131, the lower portion of the handle member 134 is moved into the longitudinal groove 132a of the mounting base 132. Consequently, the lower portion of the handle member 134 and the lower portion of the installation base 132 ar tilted rightward in FIG. 8 or loosened. However, in the third embodiment, the projection 131c is in contact with the internal thread 134a of the handle member 134, and therefore, the tilt and looseness of the handle member 134 can be eliminated.

It is to be noted that in the installation base 132, a portion having the external thread 132b and a portion lower than the former may be integrally formed from separate members, and are then fixedly mounted. In this case, the lower portion can be formed from a vibration damper such as rubber.

While only several embodiments of the present invention have been shown and described, it is to be understood that many changes and modifications may be made thereunto, without departing from the spirit and scope of the invention as defined in the appended claims.

What is claimed is:

1. A caster with an installation base comprising:
a shaft to be secured to a leg or bottom of a machine or instrument, a frame rotatably mounted on said shaft, wheels supported on said frame, an installation base arranged unrotatably and vertically movable on said frame, and a handle member for vertically moving said installation base;
said frame comprising a connecting portion having a periphery, said frame being rotatably mounted on said shaft and an axle supporting portion for supporting an axle of said wheels;
said installation base comprising a first portion having a periphery and arranged in the periphery of the connecting portion of said frame, said first portion having an external thread formed in the outer peripheral surface, and said installation base having a second portion positioned below said shaft to come into contact with an installation surface;
said handle member having an internal thread and being arranged in the periphery of the first portion of said installation base, so that said internal thread formed in the inner peripheral surface thereof is threadedly engaged with the external thread of said installation base first portion, said handle member being rotatably supported on said shaft; and
said wheels being mounted on opposite ends, respectively, of the axle and at a position externally of the internal thread of said handle member.

2. A caster with an installation base, comprising:
a shaft to be secured to a leg or bottom of a machine or instrument;
a frame rotatably mounted on said shaft;
wheels supported on said frame;
an installation base arranged unrotatably and vertically movable on said frame;
a handle member for vertically moving said installation base;
said frame comprising a connecting portion having a periphery and mounted on said shaft, said connecting portion being formed in the periphery of said frame with an installation base holding member receiving space whose upper and lower portions are opened, a handle member receiving portion for receiving said handle member externally of said installation base holding member receiving space and an axle supporting portion for supporting an axle of said wheel;
said installation base holding member receiving space receiving therein an installation base holding member, said holding member having an upper outer peripheral surface having an external thread so that an upper portion of said external thread is projected upwardly from said installation base holding member receiving space, so that said installation base holding member is vertically movable in a non-rotatable manner;
said installation base holding member having an installation base body integrally secured to the lower portion thereof; and
said handle member having an inner peripheral surface having an internal thread, said handle member being received rotatably with respect to said frame by said handle member receiving portion, said handle member being arranged in said outer peripheral surface of said installation base holding member, so that said internal thread is threadedly engaged with the external thread of said installation base holding member; and
said wheels being mounted on opposite ends, respectively, of the axle and at a position externally of said handle member receiving portion.

3. A caster with an installation base comprising:
a shaft to be secured to a leg or bottom of a machine or instrument, said shaft having a periphery;
a frame rotatably mounted on said shaft;
wheels supported on said frame;
an installation base arranged unrotatably and vertically movable with respect to said frame;
a handle member for vertically moving said installation base;
said frame comprising a cylindrical connecting portion having a periphery and mounted on the periphery of said shaft, and an axle supporting portion extending laterally from the lower portion of said connection portion to support an axle for said wheels;

said installation base comprising a vertical movement adjusting portion having a periphery and arranged on said periphery of the connecting portion of said frame and having a longitudinal groove fitted with said axle supporting portion and said installation base having an outer peripheral surface having an external thread, and an installation surface contact portion located below said shaft for contact with the installation surface;

said handle member being arranged on said periphery of the vertical movement adjusting portion of said installation base, said handle member having an inner peripheral surface having an internal thread formed in said inner peripheral surface, said internal thread meshing with the external thread of said installation base, said handle member having a rotational connecting portion formed upwardly of said internal thread, a shaft mounting member for rotatably mounting said connecting portion of said handle member on said shaft; and said wheels being mounted on opposite ends, respectively, of the axle supported by said axle supporting portion of said frame and at a position externally of the internal thread of said handle member.

4. A caster with an installation base according to claim 3, wherein the connecting portion of said frame is formed with a projection projected into the longitudinal groove of said installation base for contact with the internal thread of said handle member.

* * * * *